United States Patent [19]

Machida et al.

[11] Patent Number: 5,443,925
[45] Date of Patent: Aug. 22, 1995

[54] NONAQUEOUS ELECTROLYTE BATTERY

[75] Inventors: Toyoji Machida, Tsunagun; Mitsunori Hara, Sumoto; Kazuro Moriwaki, Sumoto; Keiichi Tsujioku, Sumoto; Tooru Amazutsumi, Tsunagun; Hiyoshi Tamaki, Sumoto; Yasuhiro Yamauchi, Sumoto; Satoshi Narukawa, Sumoto, all of Japan

[73] Assignee: Sanyo Electric Co., Ltd., Osaka, Japan

[21] Appl. No.: 151,899

[22] Filed: Nov. 15, 1993

[30] Foreign Application Priority Data

Nov. 16, 1992 [JP] Japan .................. 4-305298

[51] Int. Cl.6 ............ H01M 6/14; H01M 2/02; H01M 4/36
[52] U.S. Cl. .................. 429/94; 429/176; 429/194; 429/218
[58] Field of Search ............ 429/94, 194, 176, 218

[56] References Cited

U.S. PATENT DOCUMENTS 3,530,001  9/1970  Harivel .................. 429/94
5,273,842 12/1993  Yamahira et al. ........ 429/94

FOREIGN PATENT DOCUMENTS 52-45888 11/1977 Japan.
1-311569 12/1989 Japan.

Primary Examiner—John S. Maples
Attorney, Agent, or Firm—Wenderoth, Lind & Ponack

[57] ABSTRACT

A nonaqueous electrolyte battery has a positive electrode, a negative electrode and separator laminate rolled into a spiral electrode unit contained in an external case filled with nonaqueous electrolyte. Battery voltage is between 3.5 V and 5.0 V when charged. A positive electrode supporting member material and the external case are both aluminum. The positive Electrode supporting member is exposed for at least a portion of the outermost winding of the spiral electrode unit, and this exposed supporting member contacts the inner surface of the external case to make an electrical connection.

8 Claims, 9 Drawing Sheets

RESTORING FORCE

NONAQUEOUS ELECTROLYTE BATTERY

BACKGROUND OF THE INVENTION

A nonaqueous electrolyte battery takes advantage of excellent characteristics at high voltage for use in various applications.

Stainless steel is generally used as the positive electrode case material for the nonaqueous electrolyte battery. High voltage batteries with 3.5 V or more per cell suffer from the problem that when stored for long periods, a portion of the positive electrode case becomes corroded and leaks liquid. Corrosion of the positive electrode case is caused by ionization of iron in the stainless steel case and dissolution of iron ions in the electrolyte. Continuation of the dissolution reaction leads finally to a corrosion hole in the positive electrode case and electrolyte leakage.

A primary lithium battery using an aluminum case was developed to prevent case corrosion. Since the dissolution voltage of aluminum is higher than that of stainless steel, positive electrode case corrosion can be prevented using aluminum.

However, to obtain high output voltage a large area spiral electrode unit is used. In the case of charge collection in a nonaqueous electrolyte battery by the positive electrode active material on the outermost winding of the spiral electrode unit contacting the aluminum positive electrode case, performance problems arise from increase in internal resistance as the electrical contact degrades. To prevent this problem, a complex structure was necessary provided a special tab-lead on the positive electrode of the spiral electrode unit for connection with the positive electrode case.

The present invention was developed for the purpose of solving problems such as those described above. It is thus a primary object of the present invention to provide a highly corrosion resistant, light weight nonaqueous electrolyte battery with a simple electrical connection scheme and excellent discharge capacity and cycling characteristics.

SUMMARY OF THE INVENTION

The nonaqueous electrolyte battery of this invention is provided with a spiral electrode unit comprising a positive electrode a negative electrode a separator, a nonaqueous electrolyte, and an external case. The battery voltage is greater than or equal to 3.5 V and less than or equal to 5.0 V. The material of a positive electrode supporting member and external ease is aluminum. At least a portion of the positive electrode supporting member material of the spiral electrode unit's outermost winding is exposed. This exposed positive electrode supporting member material is mechanically and electrically in contact with the external ease.

The positive electrode active material is preferably a compound containing lithium, and the negative electrode is a carbonaceous material that can absorb and release lithium ions. The external ease preferably has a rectangular or elliptical cross-section, and the spiral electrode unit has an elliptical shape.

Further, for an elliptical spiral electrode unit with a minor axis length a and a major axis length b, and an external ease opening with width A and length B, it is desirable to satisfy the relations:

$(a/A) \geq (b/B)$ and $(A-a) \leq (B-b)$.

DETAILED DESCRIPTION OF THE INVENTION

Materials such as platinum, titanium, and aluminum have been considered for use in an external case and electrode supporting member of high voltage batteries. Considering such factors as corrosion resistance and manufacturing scale (resources, material costs, etc.) restricts the usable materials, and inexpensive aluminum with good conduction properties is the most suitable.

Therefore, the nonaqueous electrolyte battery of the present invention, which has a voltage greater than or equal to 3.5 V and less than or equal to 5.0 V when charged, uses aluminum as the positive electrode case material to prevent case corrosion. Further, since the same effects relate to the positive electrode supporting member and terminal material, aluminum is also used for the positive electrode supporting member. Aluminum makes a high degree of corrosion resistance practical.

The nonaqueous electrolyte battery of the present invention is also provided with a structure for reliable electrical connection of the spiral electrode unit with the external case. The outermost winding of the spiral electrode unit is the positive electrode, and active material is removed from the end of the outermost positive electrode winding. This exposes aluminum supporting member material at the positive electrode surface where the active material has been removed. The exposed aluminum supporting member material electrically contacts the external case. Since the external case and the positive electrode supporting member are made from the same metal, a simple mechanical contact configuration for electrical connection and good charge collection is possible for this nonaqueous electrolyte battery.

The use of low specific gravity aluminum for the external case and the positive electrode supporting member also makes the electrolyte battery of the present invention light. For example, Table 1 compares energy density by weight for nonaqueous electrolyte batteries with aluminum and stainless steel external cases.

TABLE 1

| | Gravimetric Energy Density [Wh/Kg] |
|---|---|
| Aluminum | 97 |
| Stainless Steel | 65 |

According to Table 1, the energy density by weight for aluminum is approximately 50% greater than for stainless steel.

Incidentaly, electrical equipment that use batteries as a power source have only limited space for a battery compartment. In order to most effectively use the limited space available in electrical equipment, a square cornered battery is more suitable than a cylindrical shape. In particular, a rectangular or elliptical shape is quite effective.

Figure 6A:
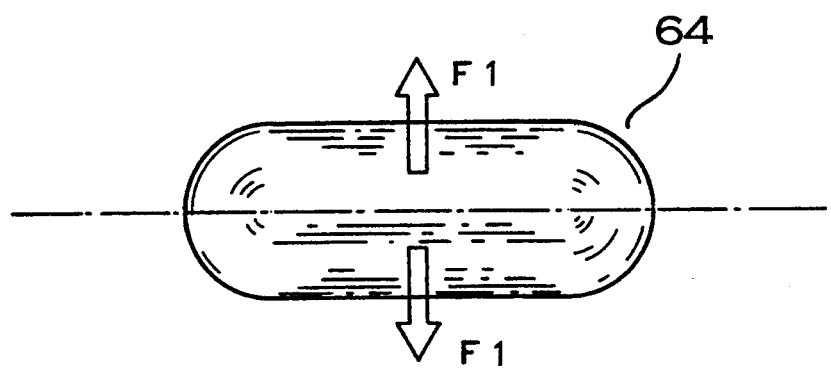
FIGS. 6A and 6B are diagrams to explain the restoring force of the spiral electrode unit.

A rectangular external case requires insertion of an elliptical spiral electrode unit rather than a circular one. An elliptical spiral electrode unit inserted into a rectangular external case exerts a recoil force F1 (see FIG. 6) tending to restore the electrode unit to a near circular shape. As shown in FIGS. 6A and 6B, the restoring force F1 acts to expand the inside of the spiral electrode unit outward. By virtue of this restoring force, the spiral electrode unit pushes against the inside walls of the external case. A good electrical connection between the spiral electrode unit and the external case can be maintained by utilizing the electrode unit's restoring force to increase its contact pressure against the external case.

To further improve electrical contact between the spiral electrode unit and the external case, the spiral electrode unit and the external case are designed to satisfy the following relations.

$$(a/A) \geqq (b/B) \text{ and}$$

$$(A-a) \leqq (B-b)$$

In these relations, a is the length of the minor axis of an elliptical spiral electrode unit, b is the length of the major axis of the elliptical spiral electrode unit, A is the inside width of the external case opening, and B is the inside length of the external ease opening. When the shapes of the spiral electrode unit and the external case satisfy these relations, the spiral electrode unit is forced with pressure against the inside of the external case due to the restoring force acting, as shown by the arrows F2 and F3 in FIGS. 3 and 4, in a direction parallel to the minor axis of the elliptical spiral electrode unit. Further, the outermost winding of the spiral electrode unit is pushed against a large surface area of the external case to make an effective electrical connection between the supporting member of the electrode unit and the external case. This creates optimum conditions for charge collection.

Figure 6A:
Figure 6B:
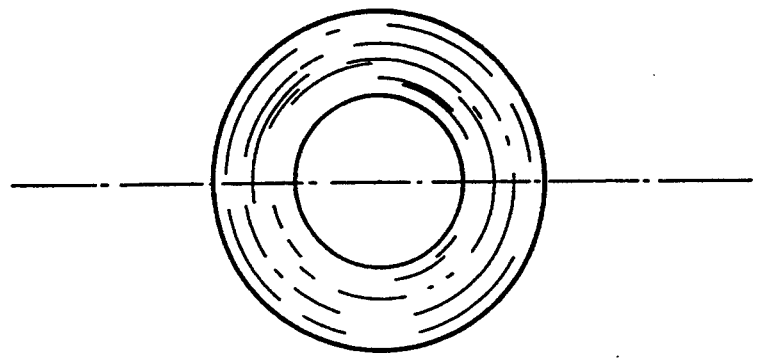

As shown in FIGS. 6, 3, and 4, the reason for this is that restoring forces F1, F2, and F3 act in directions to restore the elliptical spiral electrode units 64, 34, and 44 to nearly circular shapes. These restoring forces acts to shrink the major axes and expand the minor axes of the elliptical spiral electrode units. In trying to deform in this manner, the outermost windings of the spiral electrode units 34 and 44 are pushed against the inside surfaces of the long sides 35B and 45B of the external cases by the restoring forces F2 and F3. Consequently, the spiral electrode units make contact with nearly flat parts of the external cases, and make reliable electrical connections with the external cases over large areas.

The following describes a preferred embodiment of the present invention based on the figures.

Figure 1A:
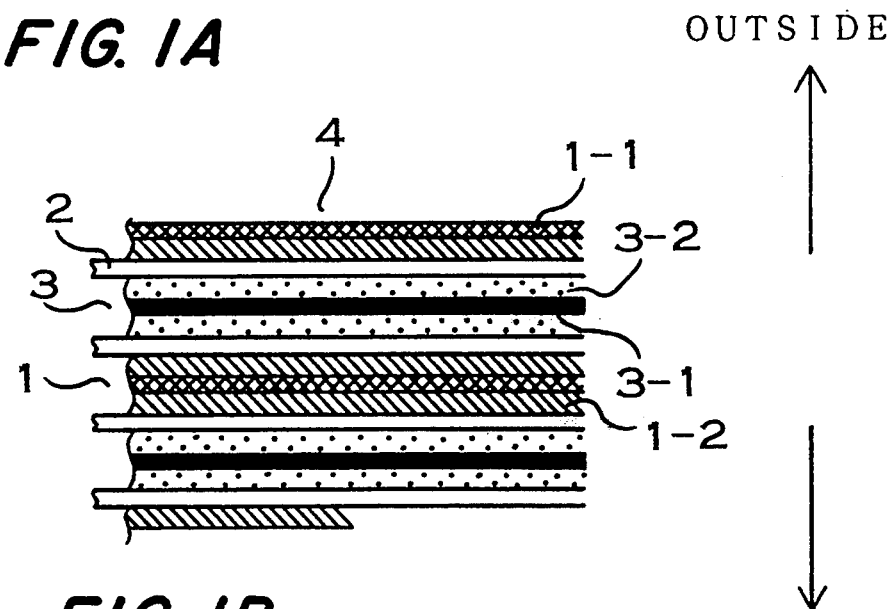
FIGS. 1A and 1B are a sectional view and a perspective view showing components of a spiral electrode unit of a battery of the present invention.
Figure 1B:
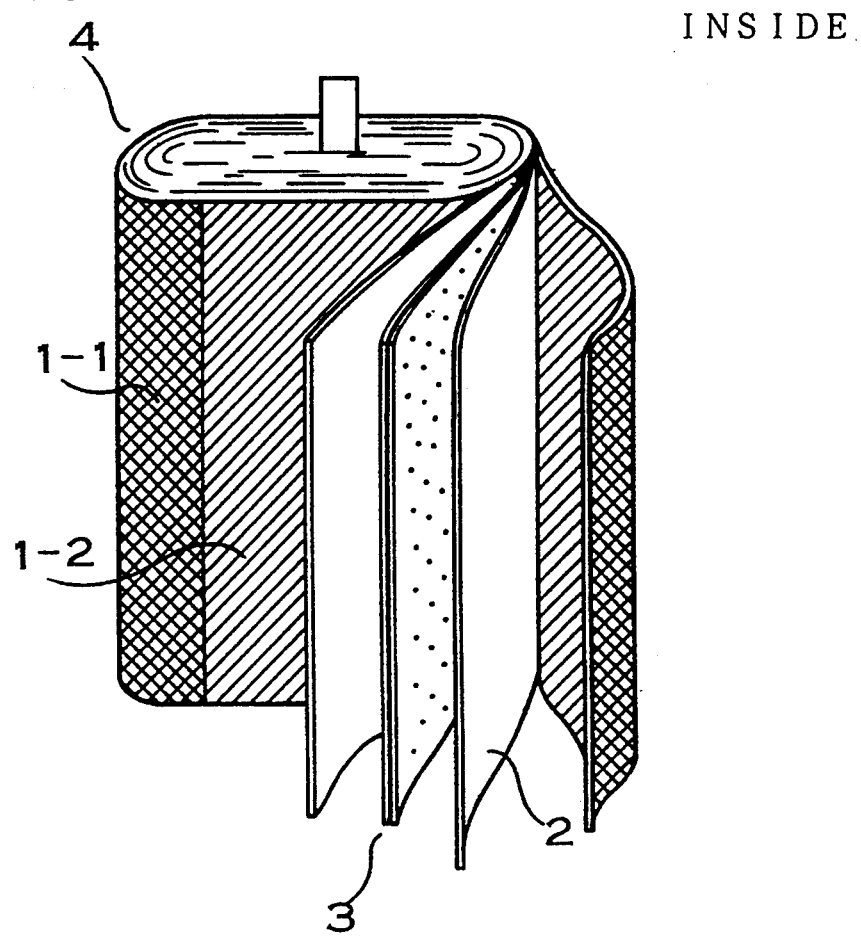

FIG. 1A shows a portion of the spiral electrode unit 4 of the nonaqueous electrolyte battery of this invention in cross-section, and FIG. 1B shows an oblique view of the spiral electrode unit 4. A spiral electrode unit 4 with this structure is manufactured in the following manner.

①  Positive Electrode Fabrication

A positive electrode chemical mixture 1-2 is made as follows. A cobalt-lithium compound active material, acetylene-black conductive material, and a fluorocarbon resin dispersion binding material are mixed together in a 90:6:4 ratio by weight. Next, this positive electrode chemical mixture 1-2 is rolled on, and attached to a slitted aluminum sheet supporting member 1—1. The aluminum sheet supporting member 1—1 with positive electrode chemical mixture 1-2 attached is heat treated in a vacuum at 250° C. for 2 hours to form the positive electrode 1. At least a portion of the end of the outer winding of the positive electrode 1 has positive electrode chemical mixture 1-2 stripped off exposing supporting member material at the surface.

② Negative Electrode Fabrication

A carbonaceous material that can absorb and release lithium ions can be used for the anode. The negative electrode is made by attaching a negative electrode chemical mixture 3-2 to the surface of a supporting member material. The negative electrode chemical mixture 3-2 is made as follows. Graphite powder that passes 400 mesh is mixed with a fluorocarbon resin dispersion binding material in a 95:5 ratio by weight. Next this negative electrode chemical mixture 3-2 is rolled onto a copper sheet supporting member 3-1. The copper sheet supporting member 3-1 with negative electrode chemical mixture 3-2 attached is heat treated in a vacuum at 250° C. for 2 hours to form the negative electrode 3.

③ Spiral Electrode Unit Fabrication

A polyethylene microporous film separator 2 is sandwiched between the positive electrode 1 and the negative electrode 3. This multi-layer sheet is rolled up to form the spiral electrode unit 4.

Figure 2A:
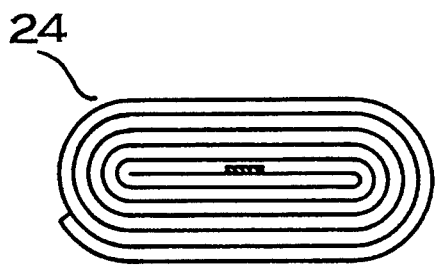
FIGS. 2A and 2B are an end view and a perspective showing the structure of the battery of the present invention.
Figure 2B:
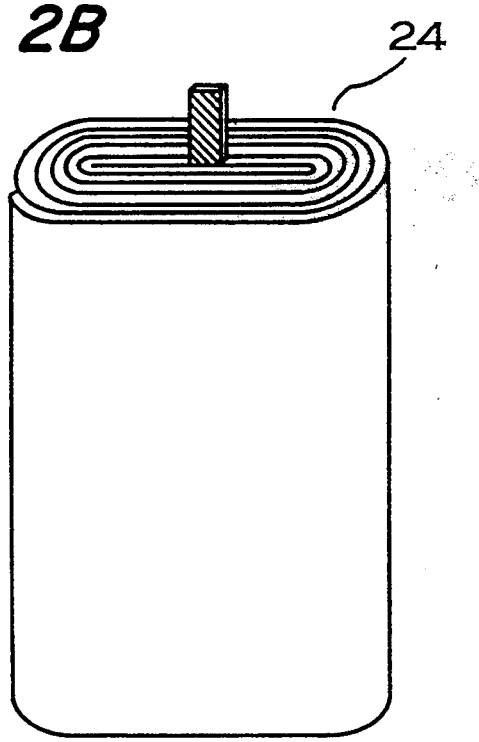
Figure 2C:
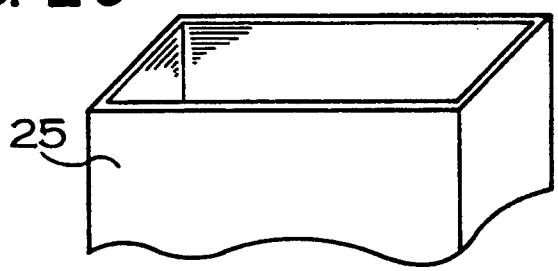
FIG. 2C is a perspective view of the case.

FIGS. 2A-2C show components of the structure of the nonaqueous electrolyte battery.

The spiral electrode unit 24 is inserted into the aluminum external case 25. The external case 25 is rectangular shaped with a bottom. The external case is filled with nonaqueous electrolyte after insertion of the spiral electrode unit 24. The nonaqueous electrolyte is a 1:1 ratio by volume of ethylene carbonate and dimethylcarbonate with 1 mole/liter of LiPF as a solute dissolved in the solvent mixture. A cover (not illustrated) provided with a safety vent is welded on the external case to tightly seal its opening. In this fashion, a nonaqueous electrolyte battery having a volume of approximately 10 cc is manufactured.

Since the nonaqueous electrolyte battery manufactured by the above process has aluminum as its external case and positive electrode supporting member material, it has improved corrosion resistance in the charged high voltage state. Further, the battery is lighter. Still further, since at least a portion of the outer winding of the spiral electrode unit's positive electrode supporting member material is exposed and electrically connected with the external case, a special positive electrode tab does not need to be provided and good charge collection is attained by favorable conditions for electrical connection between the external case and the positive electrode supporting member.

Figure 3A:
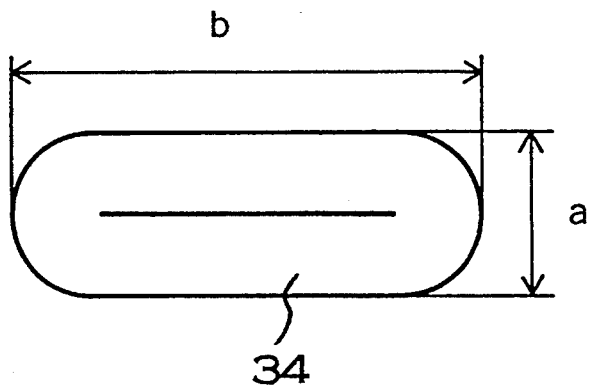
FIGS. 3A-3C are views of a spiral electrode unit, an external case, and battery of the present invention.
Figure 3B:
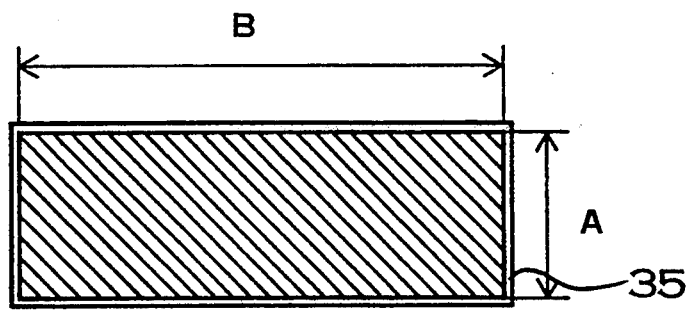
Figure 3C:
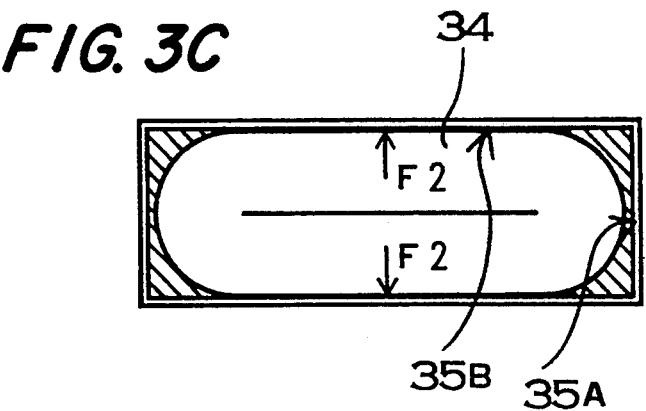

FIG. 3A is a cross-section of the spiral electrode unit, FIG. 3B is a cross-section of the external case, and FIG. 3C is a cross-section of the nonaqueous electrolyte battery with the spiral electrode unit inserted. In the nonaqueous electrolyte battery of this figure, A is the width of the external case 35, B is the length of the external case 35, a is the width of the spiral electrode unit 34, and b is the length of the spiral electrode unit 34. In the case shown in FIGS. 3A-3C the relations:

$(a/A) > (b/B)$ and $(A-a) < ((B-b)$ are satisfied.

When the dimensions of the spiral electrode unit 34 and the external case 35 satisfy the above equations, a restoring force due the spiral electrode unit 34 trying to attain a circular shape acts in a direction parallel to the minor axis of the spiral electrode unit, as shown by arrow F2 in FIG. 3C. For this reason, the external case 35 is in intimate contact with a large planar area of the spiral electrode unit 34, and the external case 35 and the spiral electrode unit 34 are favorably disposed for good electrical contact.

Figure 4A:
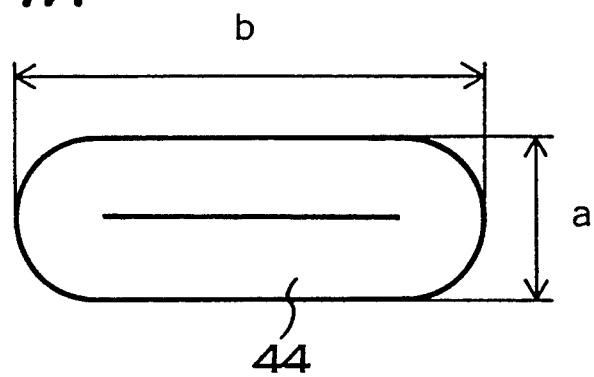
FIGS. 4A-4C are views of a spiral electrode unit an external case, and a nonaqueous electrolyte battery, respectively, of the present invention.
Figure 4B:
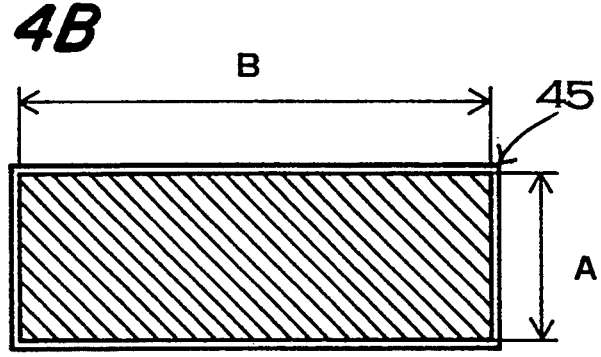
Figure 4C:
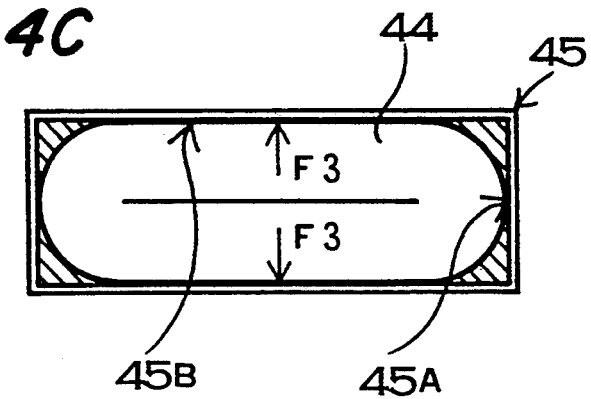

FIGS. 4A-4C show nonaqueous electrolyte battery designed such that the external case 45 and the spiral electrode unit 44 satisfy the relations:

$(a/A) > (b/B)$ and $(A-a) < (B-b)$.

FIG. 4A is a cross-section of the spiral electrode unit, FIG. 4B is a cross-section of the external ease, and FIG. 4C is a cross-section of the nonaqueous electrolyte battery.

The nonaqueous electrolyte battery of FIGS. 4A-4C has equal external ease width A and spiral electrode unit width a, and has equal external ease length B and spiral electrode unit length b. The outermost winding of the spiral electrode unit 44 can contact both the inside surface of the width of the external ease 45A and the inside surface of the length of the external ease 45B.

Figure 5A:
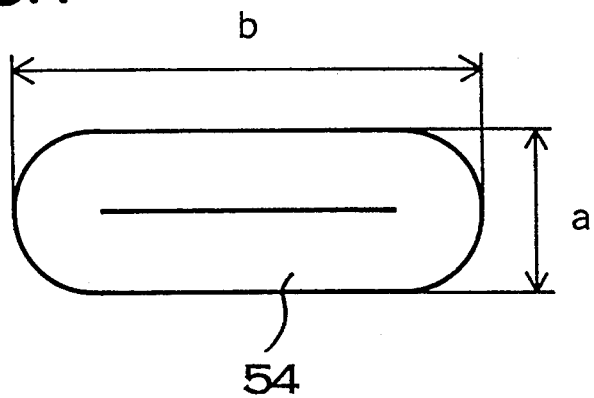
FIGS. 5A-C are views of a spiral electrode unit, an external case, and a nonaqueous electrolyte battery, respectively, for comparison.
Figure 5B:
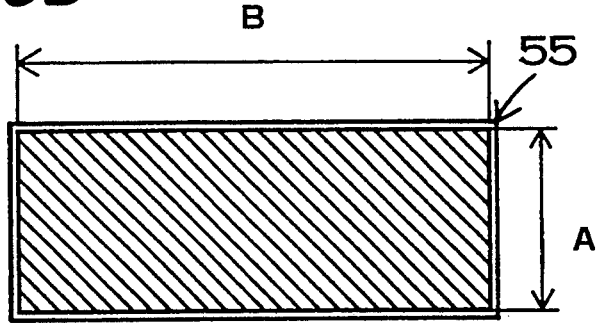
Figure 5C:
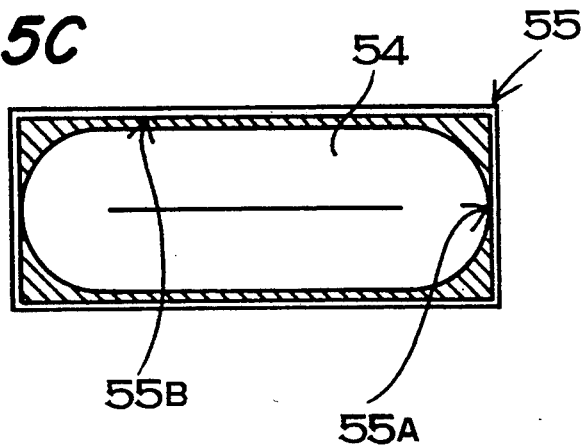

FIGS. 5A-5C show a nonaqueous electrolyte battery designed for comparison such that the external case 55 and the spiral electrode unit 54 satisfy the relations:

$(a/A) < (b/B)$ and $(A-a) > (B-b)$.

FIG. 5A is a cross-section of the spiral electrode unit, FIG. 5B is a cross-section of the external ease, and FIG. 5C is a cross-section of the nonaqueous electrolyte battery.

In this nonaqueous electrolyte battery configuration, the long sides of the spiral electrode unit 54 do not contact the inside of the external case because the width a of the spiral electrode unit 54 is shorter than the width A of the external ease. The structure of this nonaqueous electrolyte battery has a detrimental effect on electrical characteristics because the spiral electrode unit 54 only contacts the external case 55 along its shorter dimension 55A.

Experiment 1

Ten units each of a nonaqueous electrolyte battery A1 according to FIGS. 3A-3C, a nonaqueous electrolyte battery A2 according to FIGS. 4A-4C, and a comparison nonaqueous electrolyte battery X according to FIGS. 5A-5C were fabricated, and initial internal resistance and short circuit current were measured. The averages of these measurements are shown in Table 2.

TABLE 2

|  | Initial Internal Resistance (m $\Omega$) | Short Circuit Current (A) |
| --- | --- | --- |
| a/A $\geq$ b/B (nonaqueous electrolyte batteries A1 and A2) | 280 | 35 |
| a/A < b/B (comparison battery X) | 360 | 20 |

As shown in this table, the nonaqueous electrolyte batteries A1 and A2 of FIGS. 3A-3C and 4A-4C have reduced initial internal resistance and improved electrical characteristics. The reason for this is because of the increase in pressure on the spiral electrode unit. In other words, the spiral electrode unit is pushed against the external case with certainty improving the contact and reducing the distance between the positive and anodes.

Experiment 2

Figure 7:
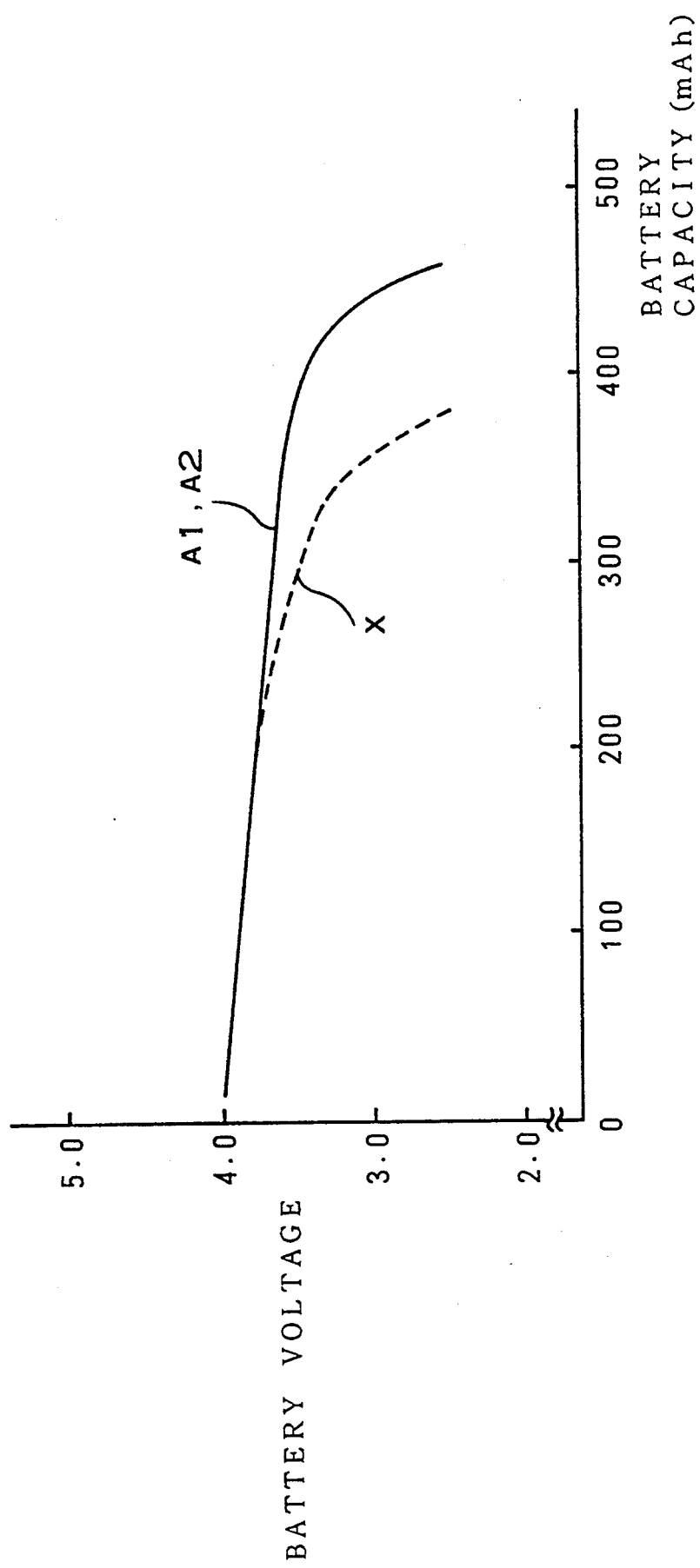
FIG. 7 is a graph showing battery discharging characteristics.
Figure 8:
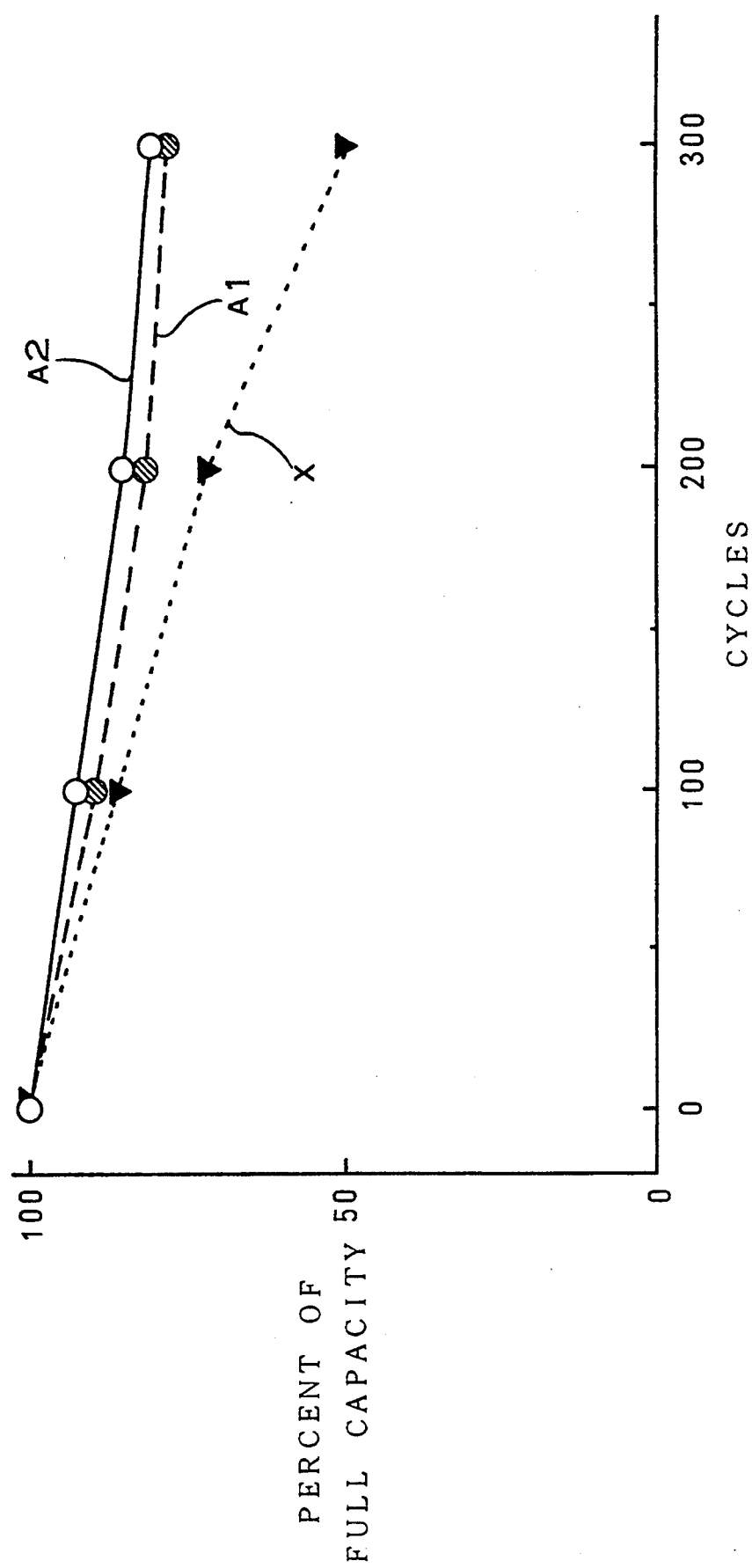
FIG. 8 is a graph showing charge-discharge cycling characteristics.

FIGS. 7 and 8 compare battery characteristics according to batteries A1 and A2 of FIGS. 3A-3C and 4A-4C with the comparison battery X.

FIG. 7 shows the discharge characteristics of batteries A1 and A2 of FIGS. 3A-3C and 4A-4C comparison battery X. This figure shows the discharge curves for the nonaqueous electrolyte batteries at 200 mA discharge current down to 2.7 V after being charged initially up to 4.2 V with 200 mA.

From FIG. 7 it is obvious that the batteries A1 and A2 of FIGS. 3A-3C and 4A-4C have a greater charge capacity after discharge than the comparison battery X.

FIG. 8 shows cycling characteristics. Here the measurement conditions were repeated cycles charging the batteries up to 4.2 V with 200 mA of current followed by discharging the batteries down to 2.7 V at 200 mA.

From FIG. 8 it is obvious that the batteries A1 and A2 of FIGS. 3A-3C and 4A-4C have improved cycling characteristics compared to battery X.

Figure 9:
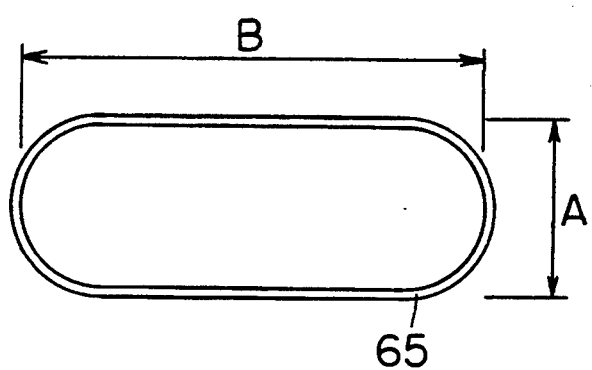
FIG. 9 is a schematic view of an external case having an elliptical cross section.

Clearly, nonaqueous electrolyte batteries with the rectangular external cases and elliptical spiral electrode units of FIGS. 3A-3C and 4A-4C maintain good pressure fits of the spiral electrode units in the external cases. This is by virtue of the restoring forces F2 and F3 on the spiral electrode units and results in good electrical contacts. Because of this pressure fitting of the spiral electrode unit, the distance between the positive and anodes is reduced, the strength of the contact between the spiral electrode unit and the external case is increased, and electrical characteristics such as discharge and cycling characteristics are improved. Although the external case is shown in FIGS. 2-5 as having a rectangular cross section, an external case 65 having an elliptical cross section can also be used, as shown in FIG. 9.

We claim:

1. A nonaqueous electrolyte battery comprising:
   an external case;
   a spiral electrode unit mounted in said external case, said spiral electrode unit including a positive electrode, a negative electrode and a separator sandwiched between said positive electrode and said negative electrode;

a nonaqueous electrolyte filled in said external case;

wherein said battery has a voltage of 3.5 V to 5 V, inclusive, when fully charged;

wherein said positive electrode is formed by a positive electrode supporting member and a positive electrode active material attached to said positive electrode supporting member;

wherein said positive electrode active material comprises a compound containing lithium;

wherein said negative electrode is formed of a carbonaceous material capable of absorbing and releasing lithium ions;

wherein said external case and said positive electrode supporting member are formed of aluminum; and wherein an outermost winding of said positive electrode active material constitutes an outermost winding of said spiral electrode unit, except that a portion of an outermost winding of said positive electrode supporting member is exposed, and an outer surface of the exposed portion of said positive electrode supporting member is in contact with an interior surface of said external case.

2. A nonaqueous electrolyte battery as recited in claim 1, wherein said positive electrode supporting member comprises a slitted aluminum sheet.

3. A nonaqueous electrolyte battery as recited in claim 1, wherein said external case is rectangular or elliptical in cross section; and said spiral electrode unit mounted in said external case is elliptical in cross section.

4. A nonaqueous electrolyte battery as recited in claim 3, wherein cross-sectional dimensions of said spiral electrode unit and said external case satisfy the following relations:

$(a/A) > (b/B)$, and $(A-a) < (B-b)$, where a is an outer width dimension of said spiral electrode unit, b is an outer length dimension of said spiral electrode unit, A is an inner width dimension of said external case, and B is an inner length dimension of said external case.

5. A nonaqueous electrolyte battery as recited in claim 1, wherein said external case is rectangular in cross section; and said spiral electrode unit mounted in said external case is elliptical in cross section.

6. A nonaqueous electrolyte battery as recited in claim 5, wherein cross-sectional dimensions of said spiral electrode unit and said external case satisfy the following relations:

$(a/A) > (b/B)$, and $(A-a) < (B-b)$, where a is an outer width dimension of said spiral electrode unit, b is an outer length dimension of said spiral electrode unit, A is an inner width dimension of said external case, and B is an inner length dimension of said external case.

7. A nonaqueous electrolyte battery as recited in claim 1, wherein said external case is elliptical in cross section; and said spiral electrode unit mounted in said external case is elliptical in cross section.

8. A nonaqueous electrolyte battery as recited in claim 7, wherein cross-sectional dimensions of said spiral electrode unit and said external case satisfy the following relations:

$(a/A) > (b/B)$, and $(A-a) < (B-b)$, where a is an outer width dimension of said spiral electrode unit, b is an outer length dimension of said spiral electrode unit, A is an inner width dimension of said external case, and B is an inner length dimension of said external case.

* * * * *